US008686958B2

(12) United States Patent
Rutledge et al.

(10) Patent No.: US 8,686,958 B2
(45) Date of Patent: Apr. 1, 2014

(54) APPARATUS AND METHOD FOR GESTURE INPUT IN A DYNAMICALLY ZONED ENVIRONMENT

(75) Inventors: James Stephen Rutledge, Durham, NC (US); Howard Locker, Cary, NC (US); Kenneth Scott Seethaler, Wake Forest, NC (US); Randall Scott Springfield, Chapel Hill, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 280 days.

(21) Appl. No.: 12/984,487

(22) Filed: Jan. 4, 2011

(65) Prior Publication Data

US 2012/0169618 A1 Jul. 5, 2012

(51) Int. Cl.
*G06F 3/041* (2006.01)

(52) U.S. Cl.
USPC .............................. 345/173; 715/701; 463/16

(58) Field of Classification Search
USPC ................. 345/1.1–3.4, 173–184; 710/1–74; 463/16–42; 715/701–702
See application file for complete search history.

(56) References Cited

U.S. PATENT DOCUMENTS

2007/0250567 A1* 10/2007 Graham et al. ............... 709/204
2009/0098932 A1* 4/2009 Longway ....................... 463/22
2009/0124321 A1* 5/2009 Gadda et al. .................. 463/16
2009/0124337 A1* 5/2009 Lyons et al. ................... 463/20
2009/0124379 A1* 5/2009 Wells ............................. 463/31
2009/0174670 A1* 7/2009 Diederiks ..................... 345/173
2009/0325686 A1* 12/2009 Davis et al. ................... 463/25
2010/0087241 A1* 4/2010 Nguyen et al. ................ 463/17
2010/0102507 A1* 4/2010 Bontempo et al. ........ 273/142 R
2010/0130280 A1* 5/2010 Arezina et al. ................ 463/20
2010/0171808 A1* 7/2010 Harrell et al. ............. 348/14.16
2010/0214391 A1* 8/2010 Graham et al. ............ 348/14.08
2010/0229090 A1* 9/2010 Newton et al. ............... 715/702
2010/0267437 A1* 10/2010 Ansari et al. .................. 463/16
2010/0318904 A1* 12/2010 Hillis et al. ................... 715/701

* cited by examiner

*Primary Examiner* — Amare Mengistu
*Assistant Examiner* — Vinh Lam
(74) *Attorney, Agent, or Firm* — Kunzler Law Group (57) ABSTRACT

An apparatus and method are disclosed for dynamically zoning a touch screen environment. The apparatus includes an identification module detecting a number of users around a perimeter of a display, a zoning module generating, via a processor, a plurality of user zones in response to the number of users detected, and a positioning module orienting a gesture zone, within each of the plurality of user zones, in relation to a corresponding user. The method includes detecting a number of users around a perimeter of a display, generating, via a processor, a plurality of user zones in response to the number of users detected, and orienting a gesture zone, within each of the plurality of user zones, in relation to a corresponding user.

21 Claims, 8 Drawing Sheets

APPARATUS AND METHOD FOR GESTURE INPUT IN A DYNAMICALLY ZONED ENVIRONMENT

BACKGROUND

1. Technical Field

The subject matter disclosed herein relates to touch screen displays and more particularly relates to dynamically zoning user zones in the display.

2. Description of the Related Art

Electronic computing devices often employ a visual display that can detect the presence and location of a touch within the display area. These types of displays are generally referred to as touch screens. Touch screens beneficially allow a user to interact directly with what is displayed instead of using a keyboard and mouse.

Early touch screen devices were only capable of identifying a single touch, and therefore, the touch screen devices were only capable of interacting with a single user. To overcome this obstacle, multi-touch screen technology has developed, and many different implementations of multi-touch screens exist. An early example of multi-touch technology involves the use of a glass panel with a camera placed behind the glass. When fingers press the glass, the camera detects the presence of the finger.

Multi-touch technology, while solving the limitations of single-touch technology, introduced a new range of issues including multiple users. In other words, current multi-touch solutions suffer from interpreting gesture input from multiple users as the systems struggle to distinguish the input of one user from the input of another user. Furthermore, as these touch screen displays increase in size, the position of the user with relation to the screen introduces other gesture input issues.

BRIEF SUMMARY

Based on the foregoing discussion, the inventors have recognized a need for an apparatus and method that dynamically zones touch screen displays. Beneficially, such an apparatus and method would partition a display into user zones.

The embodiments of the present disclosure have been developed in response to the present state of the art, and in particular, in response to the problems and needs in the art that have not yet been fully solved. Accordingly, the embodiments have been developed to provide a method and apparatus that overcome many or all of the above-discussed shortcomings in the art.

The apparatus is provided with a plurality of modules configured to functionally execute the necessary steps of dynamically zoning a touch screen display. These modules in the described embodiments include an identification module detecting a number of users around a perimeter of a display, and a zoning module generating a plurality of user zones in response to the number of users detected. The apparatus also includes a positioning module orienting a gesture zone, within each of the plurality of user zones, in relation to a corresponding user.

In one embodiment, the apparatus includes an input module receiving user input, and each of the user zones includes an instance of the input module. Each instance of the input module ignores user input that corresponds to an adjacent user zone. The positioning module rotates the gesture zone in response to a position of the user with relation to the display.

In a further embodiment, the apparatus includes a characterization module visually distinguishing each of the plurality of user zones from an adjacent user zone, and a virtual machine module operating a virtual machine within each of the plurality of user zones. Additionally, the apparatus may include an environment module detecting the type of user environment, and a sizing module resizing the plurality of user zones in response to the detected type of user environment.

A method is also presented. The method in the disclosed embodiments substantially includes the steps necessary to carry out the functions presented above with respect to the operation of the described apparatus and system. In one embodiment, the method includes detecting a number of users around a perimeter of a display, generating a plurality of user zones in response to the number of users detected, and orienting a gesture zone, within each of the plurality of user zones, in relation to a corresponding user.

In a further embodiment, the method includes receiving user input, ignoring user input that corresponds to an adjacent user zone, and visually distinguishing each of the plurality of user zones from an adjacent user zone. Additionally, the method may include operating a virtual machine within each of the plurality of user zones, and resizing the plurality of user zones in response to the detected type of user environment.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
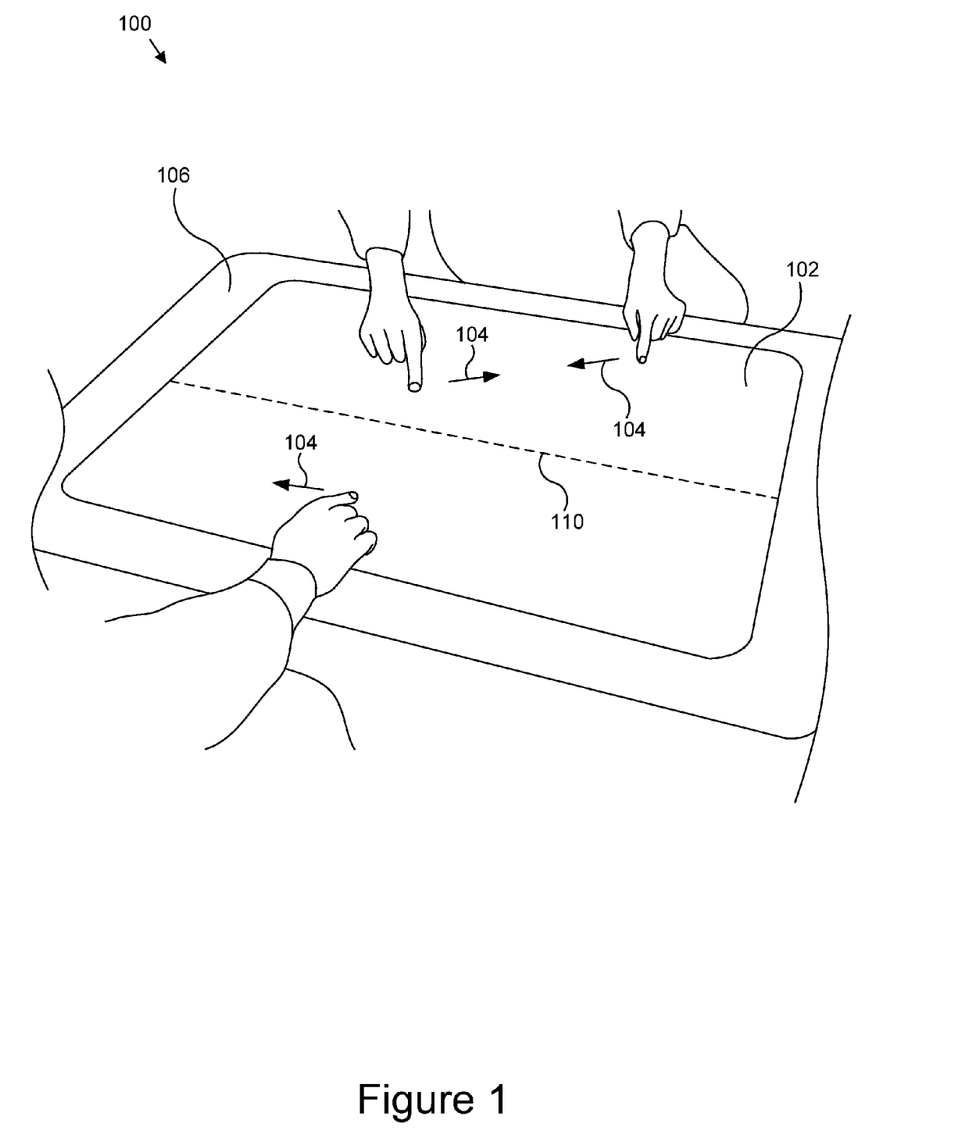
FIG. 1 is a perspective view diagram illustrating one embodiment of a multi-zoned device.

FIG. 1 is a perspective view diagram illustrating one embodiment of a multi-zoned device 100. The multi-zoned device (hereinafter "device") 100, in one embodiment, includes a touchscreen display 102. The touchscreen display 102, as depicted, is capable of receiving input from one or more users. Input may be in the form of "gestures," or in other words, movement of a user's hands or fingers, etc., across the display 102. Alternatively, the device 100 is capable of receiving input from a user by a more traditional keyboard and mouse, for example. In the depicted embodiment, gestures are illustrated by arrows 104 indicating a direction a finger is traveling across the display 102.

The device 100, in one embodiment, is an electronic computing device having a touchscreen. Examples of electronic computing devices include, but are not limited to, notebook computers, tablet computers, touchscreen monitors connected with desktop computers, smartphones, etc. The depicted embodiment illustrates an example of a tablet computer sitting on a table 106, for example, and accessible by two users seated across from each other.

Alternatively, a "touchscreen" like environment may be implemented using a camera and projector configuration. For example, the camera is configured to detect user gestures and communicate the gestures with the device 100. The projector may be used to project what would otherwise be shown on the touchscreen display described above. The camera and the projector may be directed at a common surface, for example, a wall. In other words, a user makes gestures on the wall which are detected by the camera and the projector projects an image on the wall. In a further embodiment, the camera and the projector are directed towards different areas. In this embodiment, the camera detects the motion or the gestures of a user that are not in a close spatial relationship. Stated differently, the projector may project the image or user interface on a wall (or other surface) while the user is seated on a couch.

The device 100, as depicted, includes multiple user zones 108. As used herein, the term "user zone" refers to a portion of a display or screen dedicated to a user. The user zone 108 may occupy an entire display 102, or alternatively, a portion of the display. A boundary line 110 may distinguish the boundary between user zones. In another embodiment, the device 100 may utilize other visual indicators to distinguish between user zones, including but not limited to, different colored backgrounds, different levels of brightness, different orientations of the same background image, etc. The modules and methods to implement user zones will be described below.

Figure 2:
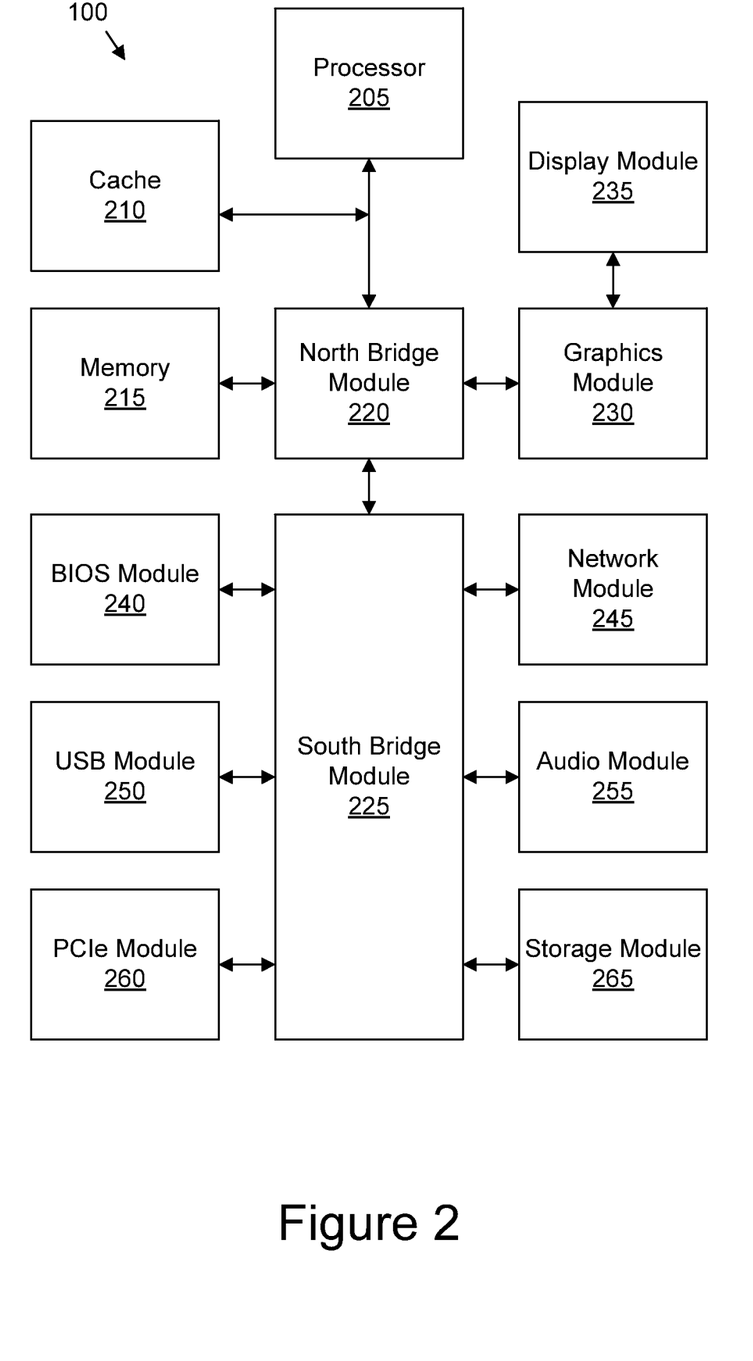
FIG. 2 is a schematic block diagram illustrating another embodiment of a device.

FIG. 2 is a schematic block diagram illustrating one embodiment of a device 100 as described above with reference to FIG. 1. In the depicted embodiment, the device 100 is an electronic computing device. The device 100 includes a processor 205, a cache 210, a memory 215, a north bridge module 220, a south bridge module 225, a graphics module 230, a display module 235, a basic input/output system (BIOS) module 240, a network module 245, a USB module 250, an audio module 255, a computer bus module 260 (such as a peripheral component interconnect express (PCIe)), and a storage module 265.

The processor 205, cache 210, memory 215, north bridge module 220, south bridge module 225, graphics module 230, display module 235, BIOS module 240, network module 245, USB module 250, audio module 255, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The processor 205 executes processor-readable programs as is well known to those skilled in the art. The processor-readable programs may be tangibly stored in the memory 215. The processor-readable programs may also be tangibly stored in the storage module 265. The storage module 265 may be a hard disk drive, an optical storage device, a holographic storage device, a micromechanical storage device, a semiconductor storage device, or the like.

The processor 205 may communicate with the cache 210 through a processor interface bus to reduce the average time to access the memory 215. The cache 210 may store copies of the data from the most frequently used memory 215 locations. The north bridge module 220 may communicate with and provide bridging functionality between the processor 205, the graphic module 230, the memory 215, and the cache 210. The processor 205 may be connected to the north bridge module 220 over a front side bus.

The north bridge module 220 may be connected to the south bridge module 225 through a direct media interface (DMI) bus. The DMI bus may provide a high-speed, bi-directional, point-to-point link supporting a clock rate for example of one Gigabytes per second (GBps) in each direction between the north bridge module 220 and the south bridge module 225. The south bridge module 225 may support and communicate with the BIOS module 240, the network module 245, the PCI module 260, and the storage module 265.

The PCI module 260 may communicate with the south bridge module 225 for transferring data or power to peripheral devices. The PCI module 260 may include a PCI bus for attaching the peripheral devices. The PCI bus can logically connect several peripheral devices over the same set of connections. The peripherals may be selected from a printer, a joystick, a scanner, or the like. The PCI module 260 may also comprise an expansion card as is well known to those skilled in the art.

The BIOS module 240 may communicate instructions through the south bridge module 225 to boot the electronic device 110, so that processor readable programs stored on the storage module 265 can load, execute, and assume control of the electronic device 110. Alternatively, the BIOS module 240 may comprise a coded program embedded on a chipset that recognizes and controls various devices that make up the electronic device 110.

The network module 245 may communicate with the south bridge module 225 to allow the electronic device 110 to communicate with other devices over a network such as the networks described above with reference to FIG. 1. The devices may include routers, gateways, servers, printers, and the like.

The display module 235 may communicate with the graphic module 230 to display information. The display module 235 may be a cathode ray tube (CRT), a liquid crystal display (LCD) monitor, electronic ink, or the like. The USB module 250 may communicate with one or more USB compatible devices such as a portable storage device over a USB bus. The audio module 255 may generate an audio output. The above described components function together and communicate with an operating system to provide a platform upon which applications and modules may run.

Figure 3:
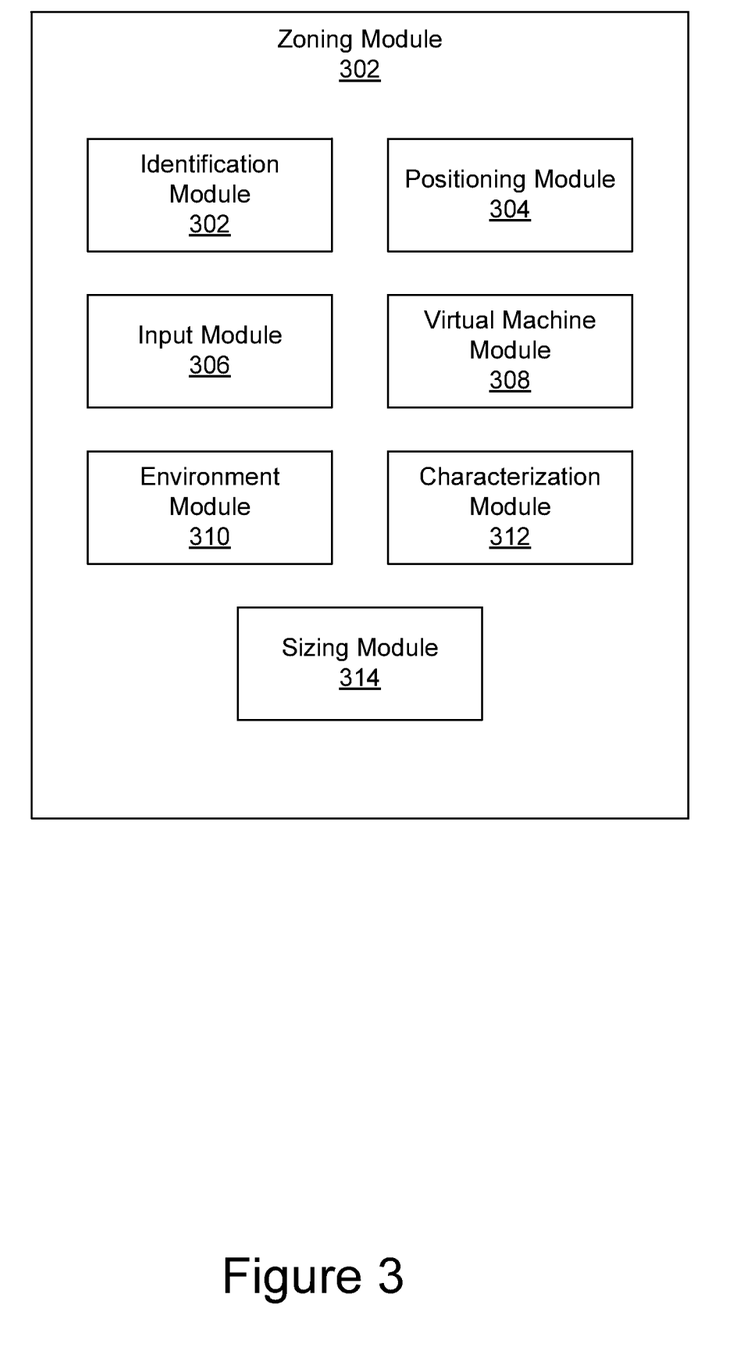
FIG. 3 is a schematic block diagram illustrating one embodiment of a zoning module.

FIG. 3 is a schematic block diagram illustrating one embodiment of a zoning module 300. The zoning module 300 is operatively coupled with the device 100 as described above with reference to FIGS. 1 and 2. In other words, the zoning module 300 operates as part of the operating system of the device 100, or alternatively, is integral to the hardware/software of the device 100 as described above with reference to FIG. 2.

The zoning module 300 generates user zones in the display of the device 100 of FIG. 1. In one embodiment, the zoning module 300 includes an identification module 302, a positioning module 304, an input module 306, a virtual machine module 308, an environment module 310, a characterization module 312, and a sizing module 314. The zoning module 300 may be configured to partition the display 102 into multiple user zones according to the number of users detected around the perimeter of the display.

The zoning module 300, in one embodiment, creates user zones having equal surface areas. For example, the zoning module 300 may generate two user areas having equal surface areas, as depicted in FIG. 1. Alternatively, the zoning module 300 may allocate more surface area to a "master zone" as will be described below. The zoning module 300 selects an appropriate geometric shape for the user zones depending on the number of users and the shape of the display 102. In other words, if the shape of the display is circular, the zoning module 300 may determine that an appropriate shape for the user zone is a half circle, or in the case of three or more users, multiple equal-sized sectors corresponding to the number of users.

The identification module 302 detects the presence and position of users around the perimeter of the display. The identification module, in one embodiment, uses sensors to detect a user. Examples of sensors capable of detecting a user include, but are not limited to, capacitive sensors in the display, motion sensors, heat sensors, optical sensors, cameras, etc. The identification module, in one embodiment, may present the user with a user input interface allowing a user to directly enter a value representing the number of users. Additionally, the identification module 302 may recognize a predetermined gesture indicative of a new user. For example, the identification module 302 may be configured to recognize a "long press" gesture (holding a finger stationary for a length of time) as an indication that a new user is present.

Furthermore, the identification module 302 maintains and updates the number of current users. As a user finishes a session with the device 100, the user may simply leave or alternatively indicate, in a manner similar to that described above with a predetermined gesture, that the user's session is over. The identification module 302 then updates the number of current users. The zoning module 300 communicates with the identification module 302 to determine the number of users and subsequently partitions the display 102 accordingly. For example, if the identification module 302 detects three users, the zoning module 300 generates three user zones.

The positioning module 304, in one embodiment, creates a gesture zone within each user zone. Additionally, the positioning module 304 orients the gesture zone within the user zone according to the position of the user. The orientation of the gesture zone depends upon the position of the user with relation to the device 100. The gesture zone, as will be described in greater detail below, receives input from the user.

The gesture zone may have the same surface area as the user zone, or alternatively, the gesture zone may be implemented with a smaller surface area. In one example, the gesture zone may include a virtual keyboard, and as such, the positioning module 304 orients the gesture zone so that the keyboard will have the proper orientation with respect to the user. In other words, the positioning module 304 ensures that the gesture zone is not "upside down," for example.

The input module 306 receives input from the user in the form of gestures or other forms of input. The other forms of input include, but are not limited to, keyboard and mouse, virtual keyboard and mouse, or a separate touchpad in communication with the device 100. In one embodiment, the zoning module 300 may initiate an instance of the input module 306 for each user zone. Alternatively, a single input module 306 may recognize and receive input for each user zone.

The input module 306, in another embodiment, tracks the input of each user and directs the input to the user's corresponding user zone. In other words, the input module 306 ignores input or gestures from a user that may cross a boundary line (as described in FIG. 1) to a user zone that is not the user's corresponding user zone.

The virtual machine module 308 provides a virtual machine that operates within a user zone. Virtual machines are software implementations of a computer that function in a manner to physical computers. The virtual machine module 308, therefore, simulates an independent operating system. As such, each user zone may be implemented with a unique virtual machine capable of customization by the user of each user zone. The modules described with reference to FIG. 3 communicate with the virtual machine module 308 to provide, for example, the partitioning of user zones, orientation of gesture zones, and user input.

The environment module 310 detects the user environment and communicates the environment with the zoning module 300 so that the zoning module 300 may generate user zones in response to the detected environment. The user environment, as used herein, refers to the type of application running on the device 100. For example, the zoning module 300 may generate user zones differently for a point-of-sale system than for an education device, or for a gaming device. Examples of different user zones will be described below with reference to FIGS. 4-7.

The characterization module 312 visually distinguishes each user zone from an adjacent user zone. In one embodiment, the characterization module 312 utilizes boundary lines as described above with reference to FIG. 1. The characterization module 312 may outline each user zone with a boundary line. Alternatively, the characterization module 312 may visually distinguish a user zone from adjacent user zones by altering any number of visual characteristics including, but not limited to, brightness, contrast, background image, shading, etc.

The sizing module 314, in one embodiment, resizes the user zones in response to the detected environment. The sizing module 314 communicates with the environment module 310, which identifies the user environment, and in response to the detected environment enables different resizing modes. For example, the sizing module 314 may designate one of the user zones as a "master" zone, the user of which is allowed to resize any of the other zones. In one embodiment, the users of the other zones may have the option of declining or accepting a resizing by the sizing module 314.

In another resizing mode, the sizing module 314 detects user activity levels in the user zones and resizes the user zones according to the activity level. For example, if the sizing module 314 detects that one user is more active than another user (based, for instance, on the amount of time between gestures from the user), the sizing module 314 may increase the size of the user zone of the active user, and correspondingly decrease the size of the user zone of the less active user. In a similar resizing mode, based upon a detected gaming environment, the sizing module 314 may detect that one user is "winning" the game and increase the size of the user zone of the winning user and similarly decrease the user zone of the losing user.

In another embodiment, the sizing module 314 may temporarily disable a user zone following a predetermined time of user inactivity. In other words, before the zoning module 300 removes a user zone, the sizing module 314 may disable the user zone. Examples of disabling the user zone include, but are not limited to, locking the screen of the user zone, "graying out" the user zone, placing a virtual machine into a sleep state, etc. Following a second predetermined time of user inactivity, the zoning module 300 may close or remove the disabled user zone and allocate the display surface to one or more active user zones.

Figure 4:
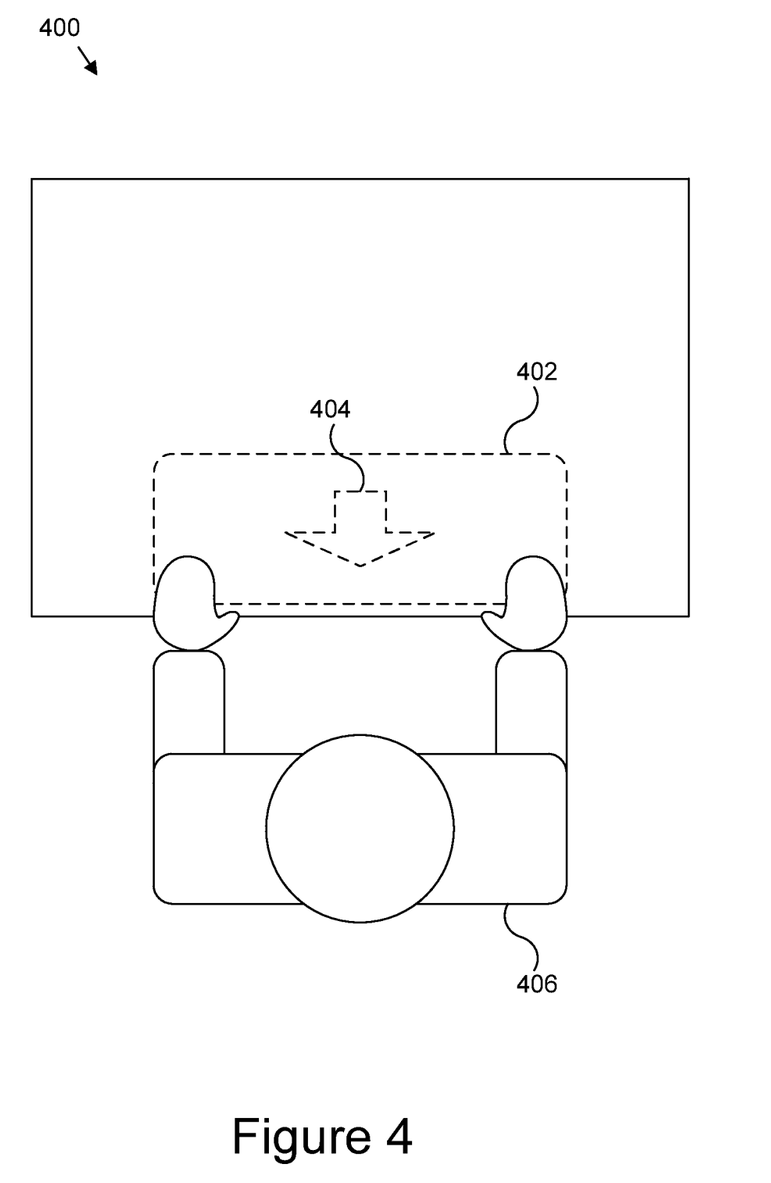
FIG. 4 is a top view diagram illustrating one embodiment of a device having a single user zone.

FIG. 4 is a top view diagram illustrating one embodiment of a device having a single user zone 400. In the depicted embodiment, the user zone 400 includes a gesture zone 402 oriented towards the user as indicated by arrow 404. The gesture zone 402 and the arrow 404 are depicted with dashed lines to indicate an embodiment where the gesture zone 402 is visually indistinguishable from the user zone 400. Alternatively, the gesture zone 402 may be visually distinguishable within the user zone 400. For example, the characterization module 312 of FIG. 3 may distinguish the gesture zone 402 within the user zone 400 by increasing or decreasing the brightness of the gesture zone 402. Other examples include, but are not limited to, outlining the gesture zone 402 with a visible line, increasing or decreasing the contrast, etc.

The gesture zone 402, in one embodiment, may depict virtual input devices such as a virtual keyboard or virtual mouse. In another embodiment, the gesture zone 402 is a dedicated area for receiving gestures from the user 406. Gestures, as described above, include movements of a hand or finger across the touchscreen display. The input module 306 orients 404 the gesture zone 402 towards the user to better interpret gestures. In other words, a gesture that is input to a gesture zone having the correct orientation may have a different meaning than the same gesture input to a gesture zone having the incorrect orientation. As described above, the identification module 302 identifies the position of the user by, for example, utilizing a sensor. The identification module 302 then communicates the position with the positioning module 304 which subsequently orients the gesture zone 402 towards the user to improve identification of gestures.

Alternatively, the positioning module 304 may analyze gestures and determine that the gesture zone 402 is not oriented properly. For example, the positioning module is configured to identify that gestures are input upside down and subsequently orient the gesture zone towards the user 406.

Figure 5:
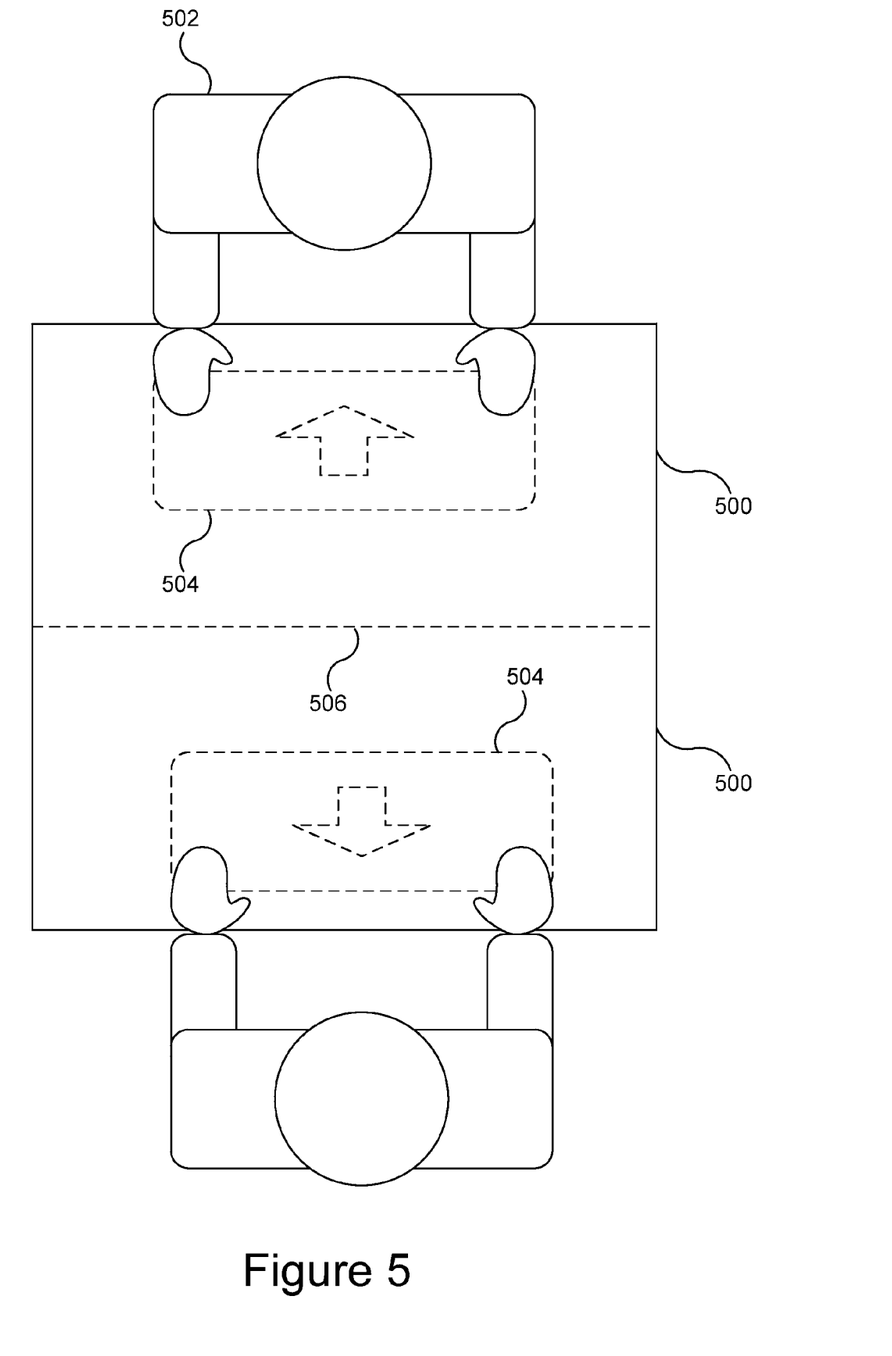
FIG. 5 is a top view diagram illustrating one embodiment of a device having multiple user zones.

FIG. 5 is a top view diagram illustrating one embodiment of a device having multiple user zones. In the depicted embodiment, the display is partitioned into two user zones 500 corresponding to two users 502. Each user zone 500 includes a gesture zone 504 for receiving user input from the users 502. Each gesture zone 504 is oriented towards the corresponding user of the user zone 500.

In one embodiment, an input module 306 (of FIG. 3) is associated with each gesture zone 504 and configured to receive input only from the user corresponding to the gesture zone 504. For example, the input module 306 may determine that a user 502 is reaching across the boundary line 506 and subsequently ignore the input from this user. This determination may be made by communicating with the identification module 302 and interpreting sensor data including, but not limited to, capacitive touchscreen information indicating the user is reaching across the screen. Alternatively, the input module 306 may identify that gestures are input "upside down."

Figure 6:
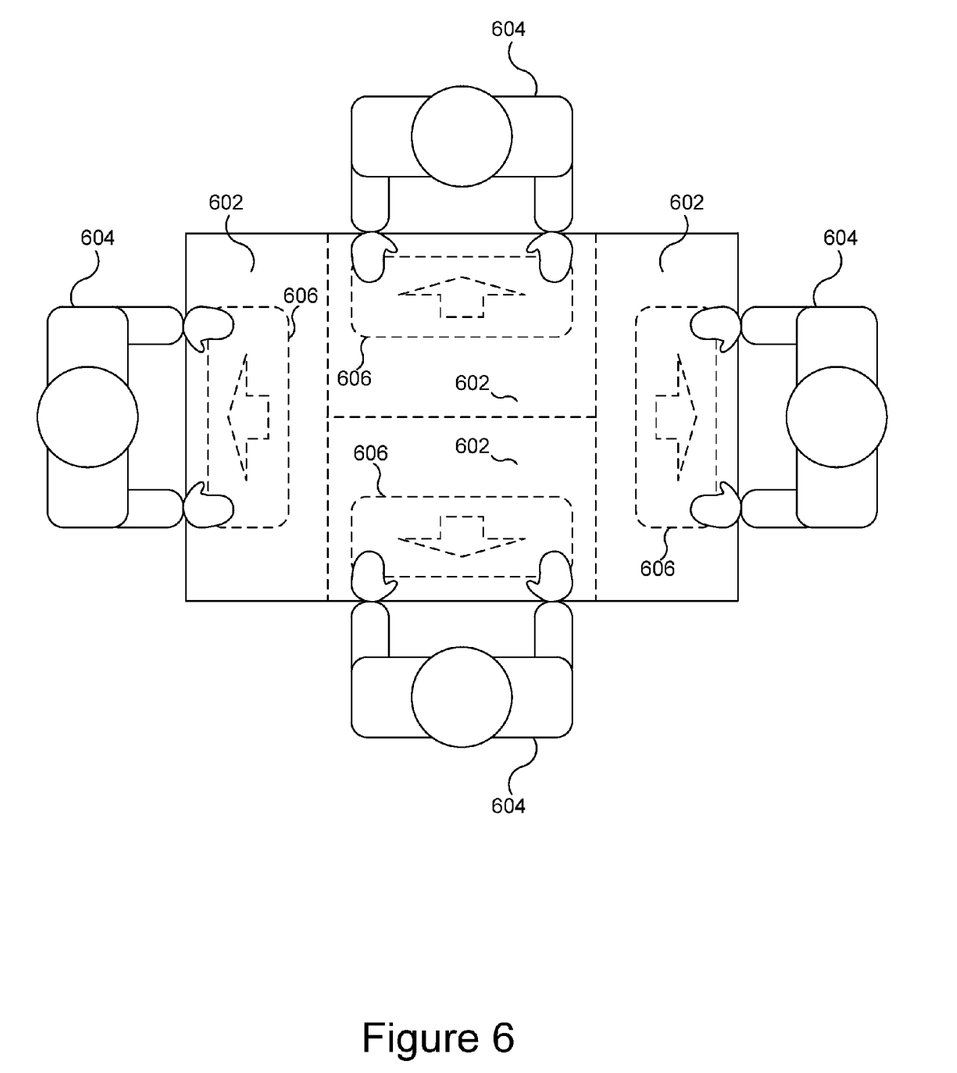
FIG. 6 is a top view diagram illustrating another embodiment of a device having multiple user zones.

FIG. 6 is a top view diagram illustrating another embodiment of a device having multiple user zones. In the depicted embodiment, the display of the device is partitioned or zoned into four user zones 602 corresponding to four users 604. The zoning module 300 may zone the display into user zones 602 of equal surface area, or alternatively, the zoning module 300 may determine the surface area of the zones based on the shape of the display and/or the activity of the users as described above.

The positioning module 304 orients the gesture zones 606 based upon the location of the user. Although the depicted embodiment illustrates a gesture zone 606 having a surface area smaller than that of the associated user zone 602, the gesture zone 606 may occupy the entire user zone 602. Furthermore, although the depicted embodiment illustrates the users in opposing positions (seated across from each other), the positioning module 304 may positions the user zones 602 in such a way to accommodate users 604 sitting adjacent each other. For example, if the users 604 were collaborating on a document and therefore were seated next to each other instead of across from each other.

Figure 7:
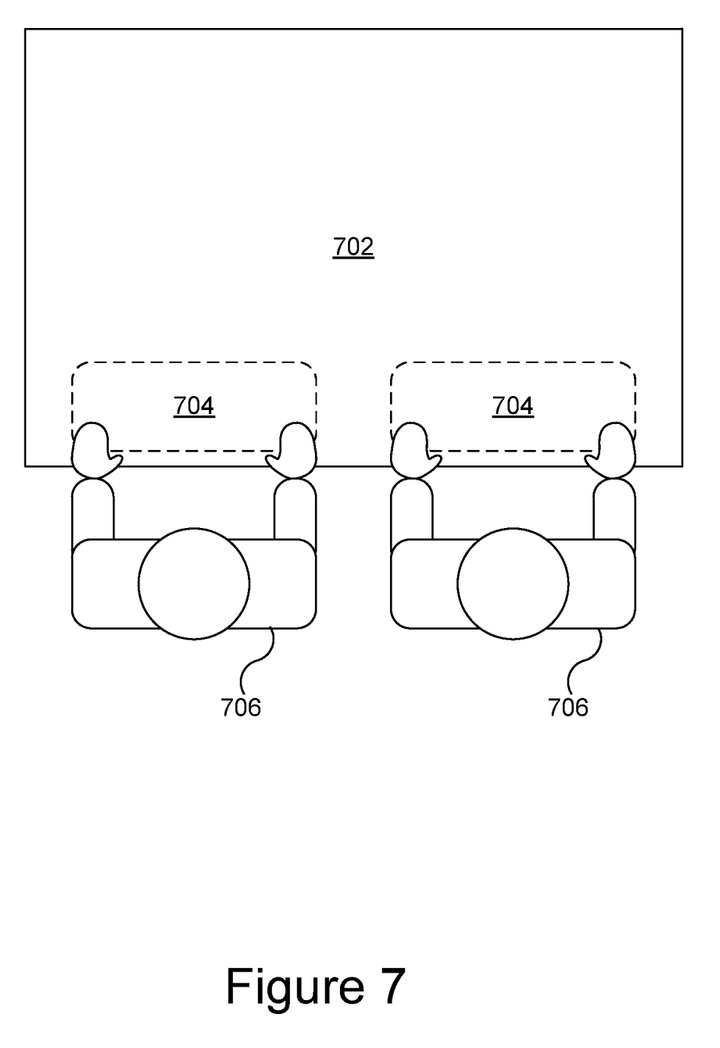
FIG. 7 is a top view diagram illustrating a device having multiple gesture zones.

FIG. 7 is a top view diagram illustrating a device having multiple gesture zones. In the depicted embodiment, the environment module 310 of FIG. 3 has identified a collaboration environment and therefore the zoning module has zoned a single user zone 702 with multiple gesture zones 704. Examples of such an environment include, but are not limited to, document editing, collaborative gaming, etc. The users 706 may simultaneously interact with a single user zone 702 through individual gesture zones 704.

Figure 8:
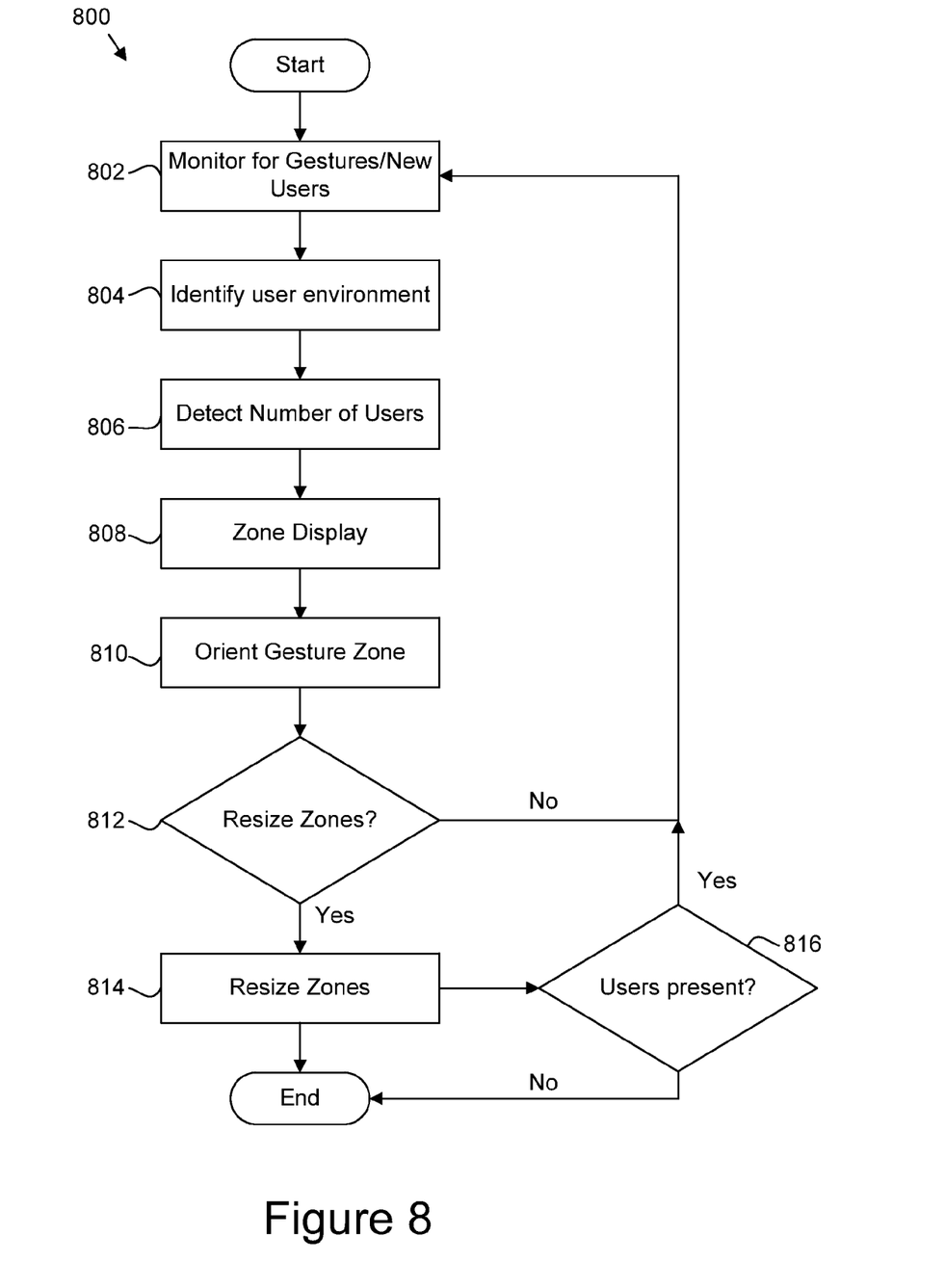
FIG. 8 is a schematic flow chart diagram illustrating a method for dynamic zoning of a touch screen display.

FIG. 8 is a schematic flow chart diagram illustrating a method 800 for dynamic zoning of a touch screen display. The method 800 starts and the identification module 302 of FIG. 3 monitors 802 or identifies new users. In one embodiment, monitoring 802 for new users includes identifying gesture input from a new user. As described above, a predetermined gesture may be defined that indicates a new user is present and ready to use the device. Alternatively, monitoring 802 for a new user may include monitoring sensor information from sensors capable of identifying a user. Examples of such sensors include, but are not limited to, optical motion sensors, capacity near-field sensors, heat sensors, etc.

The method 800 continues and the environment module 310, in one embodiment, identifies 804 the user environment. Identifying 804 the user environment may include identifying the type of application running on the device. The environment module 310 then communicates the environment information with the zoning module. Depending upon the type of user environment, the zoning module may, for example, zone the display for a collaborative environment, as depicted in FIG. 8, or alternatively for a competitive gaming environments or independent computing environments (i.e. virtual machines).

The method 800 continues and the identification module 302 detects 806 the number of users present and communicates this number with the zoning module 300. The zoning module 300 zones 808 the display in response to the number of users identified. The zoning module 300 may partition the display into equal sized partitions, or alternatively, into partitions or zones of different sizes.

The positioning module 304 then orients 810 the gesture zone within the user zone towards the user. In one embodiment, the positioning module 304 communicates with the identification module to determine the location of each user in relation to the user's corresponding user zone. The positioning module 304 continuously monitors the orientation of the gesture zone and reorients the gesture zone if a user changes position, or if the display is rotated. For example, a user may "flick" his or her user zone across the display to another user. The positioning module 304 will detect this change and orient 810 the gesture zone to the other user.

As described above, the zoning module 300 may be configured to operate in different resizing 812 modes. For example, the zoning module 300 may resize the zones based on user activity/inactivity or user environment. In another embodiment, the zoning module may designate one user zone as the master user zone so that the user of the master zone can resize the slave zones at his or her discretion. If the zoning module 300 determines 812 that a resizing 814 of the zones is necessary, the zoning module 300 resizes 814 the user zones according to one of the previously described modes.

While the identification module detects 816 users around the device, the method 800 will continue. Alternatively, if the identification module does not detect 816 any users the sizing module 314 temporarily disables the user zones for a predetermined length of time. If no user input is received during this time period, the device may be put into a sleep state, at which point the method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a display;
   a memory having code stored therein;
   a processor which is coupled to said memory and which executes the code stored in said memory, the code executed by said processor being effective to:
   determine a number of users around a perimeter of the display;
   generate a plurality of user zones in response to the number of users detected;
   detect a position of each of the users with relation to a corresponding one of the plurality of user zones;
   generate a plurality of gesture zones, each of the plurality of gesture zones corresponding to one of the plurality of user zones; and
   orient each of the plurality of gesture zones with reference to a corresponding one of the plurality of user zones according to the detected position of each of the users.

2. The apparatus of claim 1, further comprising code effective to receive user input.

3. The apparatus of claim 2, wherein each of the plurality of user zones has an instance of an input module, each instance of the input module further ignoring user input that corresponds to an adjacent user zone.

4. The apparatus of claim 1, wherein at least one of the plurality of gesture zones is a virtual keyboard, and the virtual keyboard is rotated with reference to the corresponding one of the plurality of user zones.

5. The apparatus of claim 1, further comprising code effective to visually distinguish each of the plurality of user zones from an adjacent user zone.

6. The apparatus of claim 1, further comprising code effective to operate a virtual machine within each of the plurality of user zones.

7. The apparatus of claim 1, further comprising code effective to detect a type of user environment.

8. The apparatus of claim 7, further comprising code effective to resize the plurality of user zones in response to the detected type of user environment.

9. The apparatus of claim 1, further comprising a sensor accessible by the processor for the determining of the number of users around a perimeter of the display.

10. A method comprising:
- determining a number of users around a perimeter of a display;
- generating, via a processor, a plurality of user zones in response to the number of users detected;
- detecting a position of each of the users with relation to a corresponding one of the plurality of user zones;
- generating a plurality of gesture zones, each of the plurality of gesture zones corresponding to one of the plurality of user zones; and
- orienting each of the plurality of gesture zones with reference to a corresponding one of the plurality of user zones according to the detected position of each of the users.

11. The method of claim 10, further comprising receiving user input.

12. The method of claim 10, further comprising ignoring user input that corresponds to an adjacent user zone.

13. The method of claim 10, further comprising visually distinguishing each of the plurality of user zones from an adjacent user zone.

14. The method of claim 10, further comprising operating a virtual machine within each of the plurality of user zones.

15. The method of claim 10, further comprising resizing the plurality of user zones in response to the detected type of user environment.

16. A computer product comprising a non-transitory computer readable storage medium storing a computer readable program code executed to perform operations comprising:
- determining a number of users around a perimeter of a display;
- generating a plurality of user zones in response to the number of users detected;
- detecting a position of each of the users with relation to a corresponding one of the plurality of user zones;
- generating a plurality of gesture zones, each of the plurality of gesture zones corresponding to one of the plurality of user zones; and
- orienting each of the plurality of gesture zones with reference to a corresponding one of the plurality of user zones according to the detected position of each of the users.

17. The computer program product of claim 16, further comprising receiving user input.

18. The computer program product of claim 16, further comprising ignoring user input that corresponds to an adjacent user zone.

19. The computer program product of claim 16, further comprising visually distinguishing each of the plurality of user zones from an adjacent user zone.

20. The computer program product of claim 16, further comprising operating a virtual machine within each of the plurality of user zones.

21. The computer program product of claim 16, further comprising resizing the plurality of user zones in response to the detected type of user environment.

* * * * *